April 6, 1971      W. WOELFLIN      3,574,085
ELECTRIC TREATER FOR EMULSIONS
Filed April 7, 1969      4 Sheets-Sheet 1
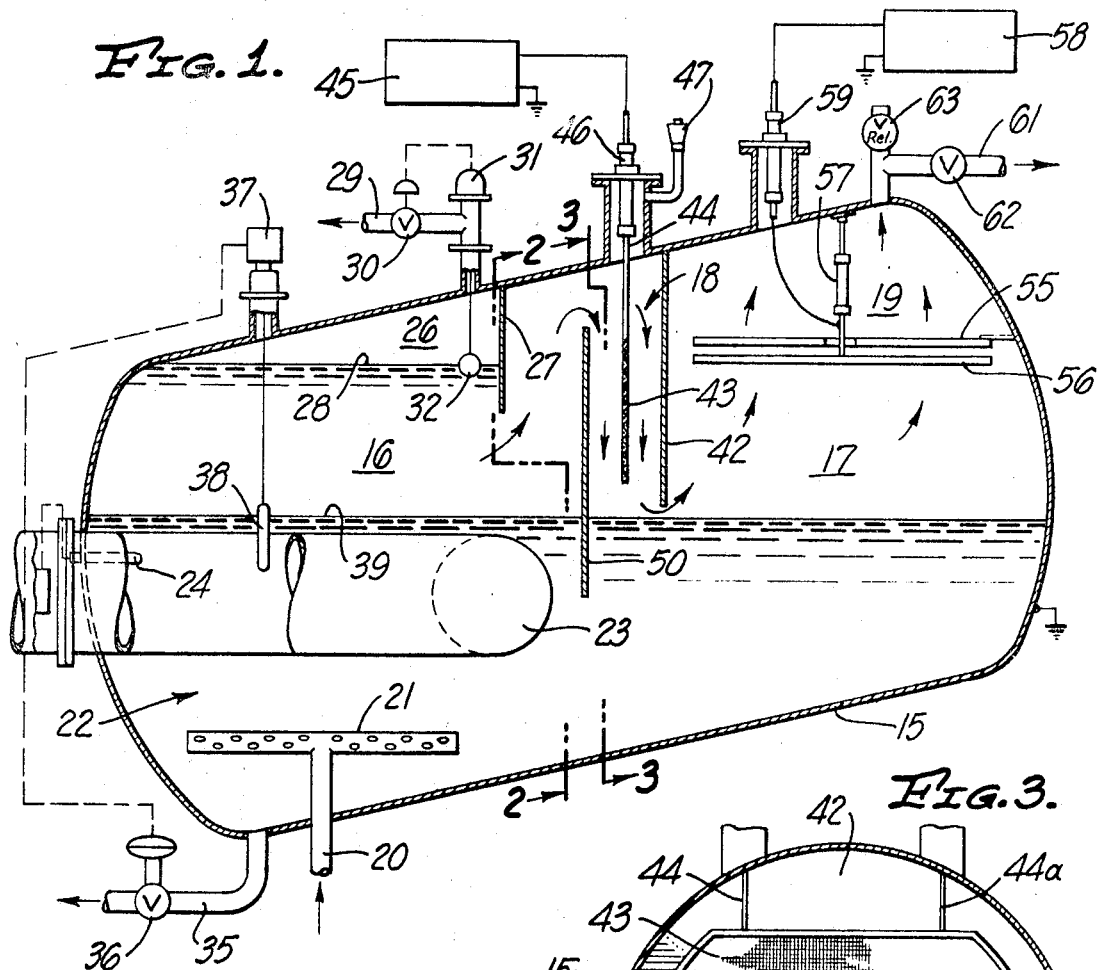
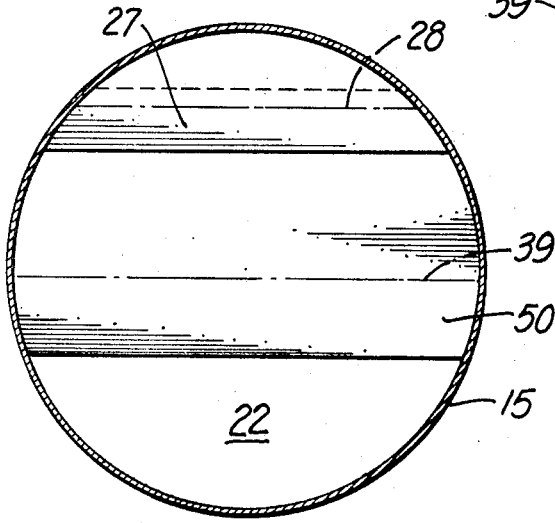
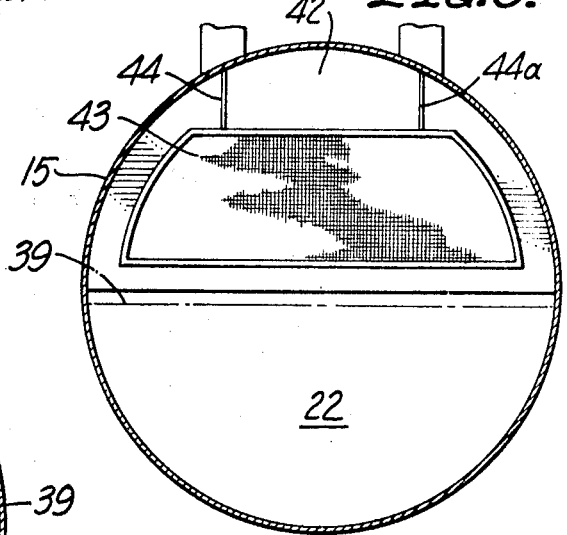
INVENTOR
WILLIAM WOELFLIN
BY HIS ATTORNEYS
HARRIS, KIECH, RUSSELL & KERN April 6, 1971 W. WOELFLIN 3,574,085
ELECTRIC TREATER FOR EMULSIONS
Filed April 7, 1969 4 Sheets-Sheet 2

INVENTOR
WILLIAM WOELFLIN
BY HIS ATTORNEYS
HARRIS, KIECH, RUSSELL & KERN

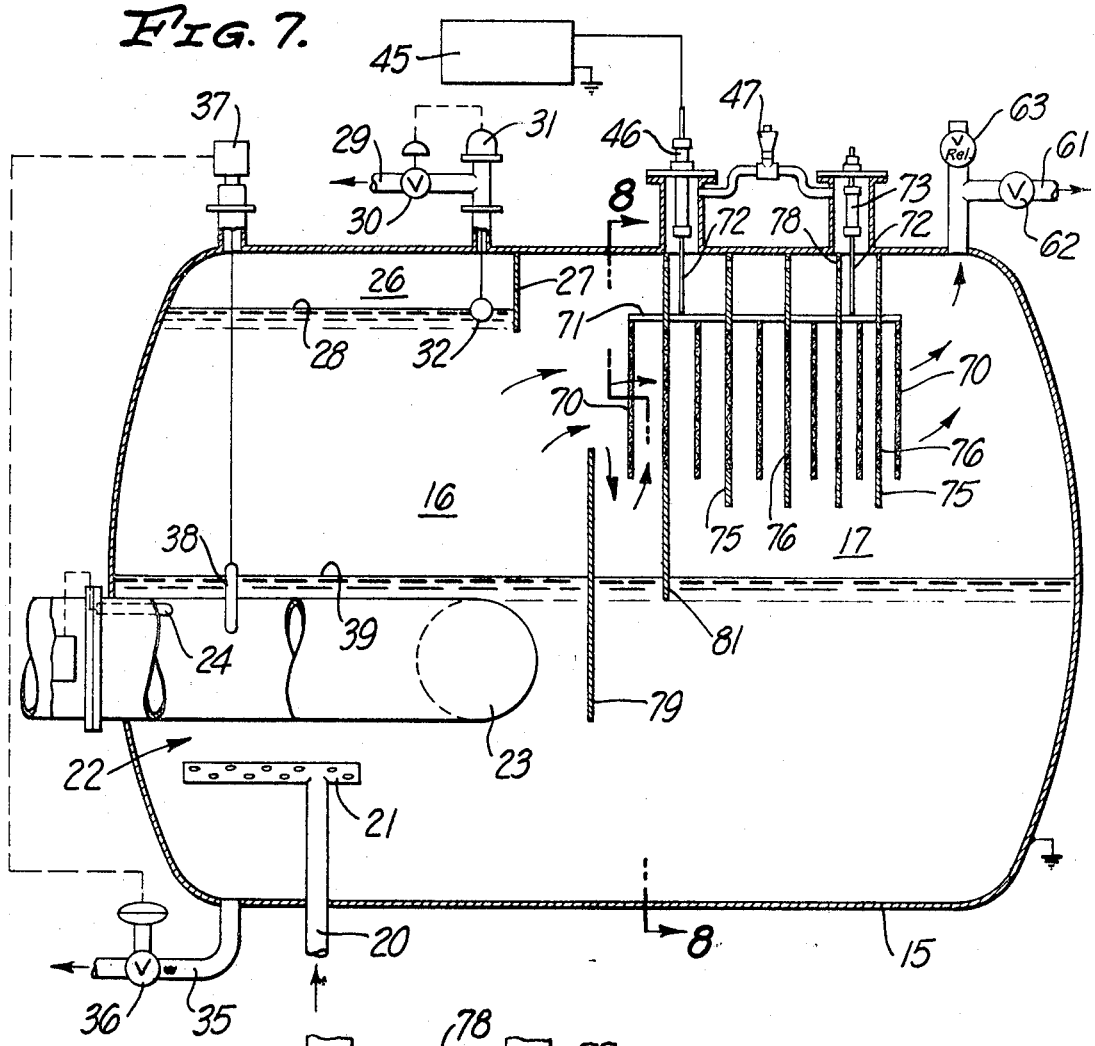

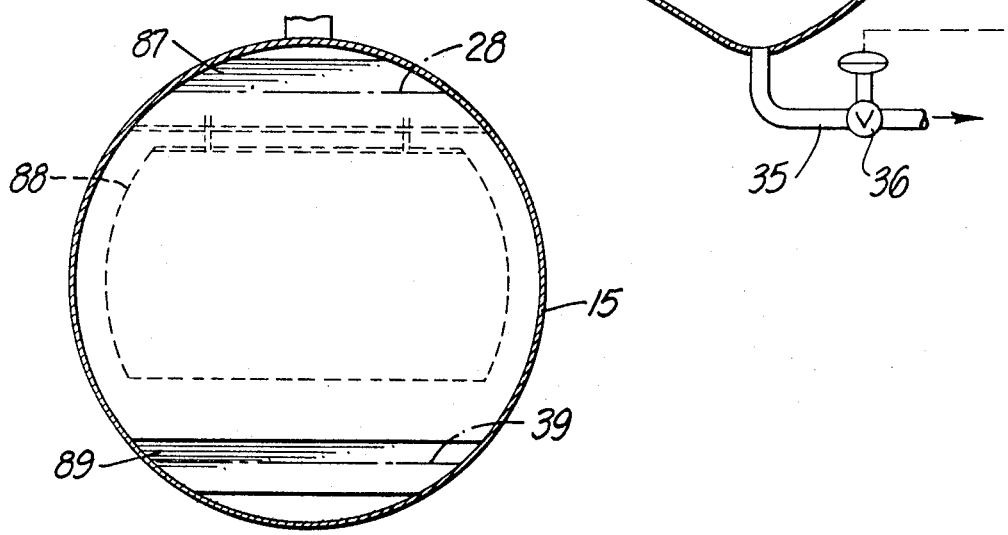

United States Patent Office 3,574,085
Patented Apr. 6, 1971

3,574,085
ELECTRIC TREATER FOR EMULSIONS
William Woelflin, Long Beach, Calif., assignor to
Petrolite Corporation, St. Louis, Mo.
Filed Apr. 7, 1969, Ser. No. 814,116
Int. Cl. B03c 5/02; C10g 33/02
U.S. Cl. 204—302
13 Claims

ABSTRACT OF THE DISCLOSURE

An electric treater with electrodes in a horizontal treating compartment above an emulsion-water interface, with the emulsion tending to flow in a horizontal path along the interface. A baffle across the interface for directing flow up away from the interface and through or past the electrodes. A tilted horizontal treater. A treater with a gas separation zone, an electric treating zone, and a settling zone, with a baffle at the treating zone at the emulsion-water interface to control emulsion flow through the treating zone.

---

This invention relates to electric treaters and, more particularly, to treaters for resolving oil-water emulsions containing gas and to treaters of a generally horizontal configuration having a pretreating section or gas separation zone ahead of the electric treating section.

Both the pretreatment of emulsions for gas separation and the electric treatment of emulsions for removal of water are old and well known processes and have been carried out with a variety of apparatus configurations. The general principles of these treatments are known and will not be discussed herein.

The purpose of the present unit is to provide a relatively simple and inexpensive treater which at the same time will handle emulsions at rates of flow meeting commercial installation requirements and which will effectively remove gas and water from the incoming stream.

Accordingly, it is an object of the invention to provide a new and improved treater comprising a generally horizontal vessel with a pretreating zone, an electric treating zone, and a settling zone, with the general flow path being from the inlet, through the pretreating zone, the electric treating zone and the settling zone. Gas may be withdrawn at the pretreating zone and oil may be withdrawn at the settling zone, with the separated water collected in a body along the lower portion of the vessel. The emulsion-water interface is maintained at a substantially constant level by drawing off water in response to a level controller. The emulsion tends to flow through the vessel along the interface and it is a further object of the invention to provide a baffle arrangement at the electric treating zone with the baffle positioned across the emulsion-water interface to direct the flow up away from the interface and through the electric field formed by the electrodes of the treating zone. An additional object is to provide various electrode and baffle arrangements for the treater of the invention. A still further object is to provide such a treater wherein the vessel may be tilted relative to the horizontal to provide a further improved operation.

The invention also comprises novel details of construction and novel combinations and arrangements of parts, which will more fully appear in the course of the following description. The drawings merely show and the description merely describes preferred embodiments of the present invention which are given by way of illustration and example.

In the drawings:

FIG. 1 is a vertical sectional view of a treater incorporating a preferred embodiment of the present invention;

FIG. 2 is a sectional view taken along the line 2—2 of FIG. 1;

FIG. 3 is a sectional view taken along the line 3—3 of FIG. 1;

FIG. 7 is a view similar to that of FIG. 1 showing a treater incorporating another alternative form of the invention;

FIG. 8 is a partial sectional view taken along the line 8—8 of FIG. 7;

FIG. 9 is a view similar to that of FIG. 1 showing another alternative form of the invention; and FIG. 10 is a sectional view taken along the line 10—10 of FIG. 9.

Figure 4:
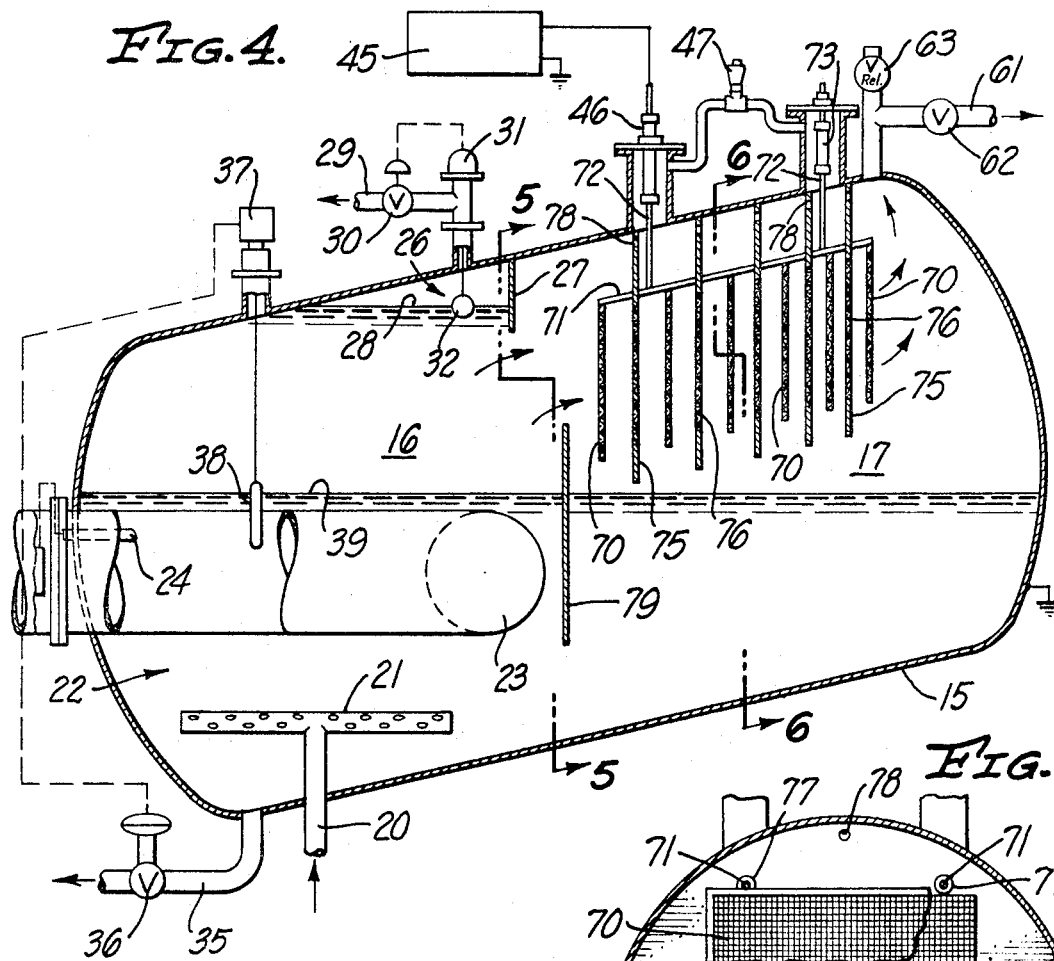
FIG. 4 is a view similar to that of FIG. 1 showing a treater incorporating an alternative form of the invention.

Referring to FIGS. 1, 2 and 3, the treater includes a cylindrical vessel 15 which is disposed in a generally horizontal position and preferably tilted about 20° with respect to the horizontal. The vessel includes a pretreating section 16 comprising a gas separation zone, and an electric treating compartment 17, which includes an electric treating zone 18 and a settling zone 19.

The incoming emulsion is introduced into the vessel via a line 20 and a perforated pipe distributor 21. The incoming emulsion flows upward through a body of water 22 past a heater 23.

The heater 23 may be a conventional heater unit and, as shown, includes a U-shaped tube carrying the heat source, typically a gas flame. A thermostat 24 is mounted in an end wall of the vessel 15 and extends into the body of water 22 to control the heat source as a function of the temperature within the vessel.

Some water may be removed from the incoming liquid as it passes upward through the body of water into the upper portion of the section 16. The heating operation tends to separate the gas from the incoming liquid and the separated gas collects in the zone 26 defined by the upper surface of the vessel 15, a baffle 27, and the gas-emulsion interface 28. Gas may be withdrawn through a line 29 having a valve 30 operated by a controller 31 incorporating a float 32 at the interface 28. The water is withdrawn via a line 35 with a valve 36 operated by a controller 37 having a float 38 at the emulsion-water interface 39. The controllers 31 and 37 are normally operated to maintain the interfaces 28 and 39 at substantially constant levels.

A set of electrodes is positioned in the treating zone and, in the embodiment of FIG. 1, comprises a semicircular plate 42 attached to the vessel 15 and a screen 43 electrically insulated from the vessel and supported on rods 44, 44a. The plate 42 serves as the ground electrode and the screen 43 is connected to a high-voltage supply 45 via a feed-through bushing 46, whereby an electric field is produced in the treating zone. A vent trap 47 may be used if desired to release gas from about the bushing 46. The plate 42 and screen 43 preferably are disposed substantially vertically in parallel relation to define a treating space therebetween. Other electrode constructions could be used; for example, the screen 43 may be an apertured plate or may be a solid plate or may be a series of rods, and the plate 42 may be an apertured plate or have some other foraminous design to permit mixing of dehydrated oil from the settling zone 19 and emulsion adjacent the screen 43, or for other reasons. A baffle is provided at the treating zone 18 and in the embodiment of FIG. 1 comprises a plate 50 mounted at each side to the vessel 15. A flow space is provided between the upper edge of the baffle 50 and the top of the vessel. The lower edge of the baffle 50 is below the emulsion-water interface 39 and spaced upward from the bottom of the vessel 15 to provide a flow space for the body 22. The baffle 50 may also serve as a grounded electrode to define the electric field in the treating space between the baffle 50 and the screen 43.

The electric field in the treating zone 18 will usually resolve the emulsion. However, an additional set of electrodes may be provided in the settling zone 19 if desired, as for additional emulsion resolution. In the preferred embodiment illustrated, a foraminous electrode 55 is supported from the wall of the vessel and serves as a ground electrode. Another foraminous electrode 56 is supported on stand-off insulators 57 and is energized from a high-voltage source 58 via a feed-through bushing 59. The electrode 56 may be energized to higher potentials than the screen 43 to resolve the emulsion to an oil with a lesser residual water content. The electrodes 55, 56 are a desirable but not an essential feature and can be omitted where the additional treating is not sought in the settling zone. The oil may be withdrawn through a line 61 with a control valve 62 therein. A pressure relief valve 63 may be provided also.

In the conventional treater of generally horizontal design, the emulsion tends to flow from the gas separation zone to the electric treating zone in a horizontal path along the emulsion-water interface 39. Treating efficiency is not good because the emulsion tends to bypass the electrodes. In addition, thermal and other types of currents tend to cause a circulating flow of treated and untreated emulsion along the interface 39, which flow also reduces treating efficiency. In contrast, the baffle 50 of the treater of FIG. 1 deflects emulsion flow up away from the interface 39, causing the emulsion to pass through substantially the entire treating space before entering the settling zone. Treated oil in the settling zone cannot be drawn along the interface 39 into the incoming emulsion. The one-way flow path is indicated by the arrows in FIG. 1.

Figure 6:
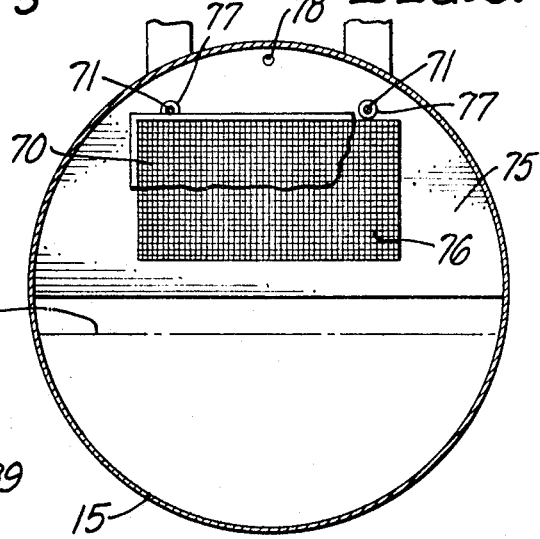
FIG. 6 is a sectional view taken along the line 6—6 of FIG. 4.
Figure 5:
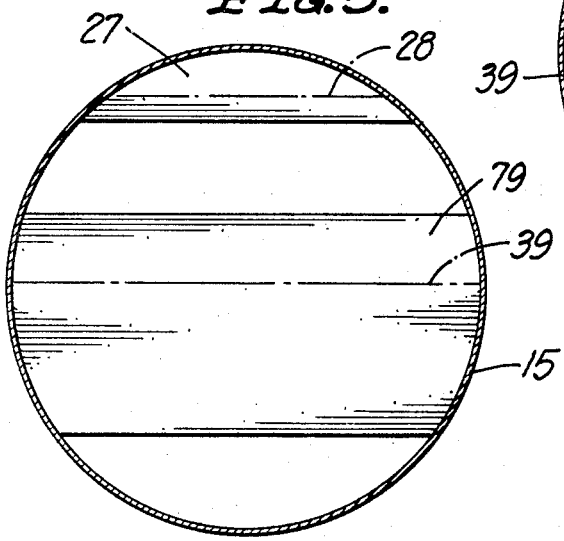
FIG. 5 is a sectional view taken along the line 5—5 of FIG. 4.

An alternative form of the treater is illustrated in FIGS. 4, 5 and 6, where elements corresponding to those of the embodiment of FIGS. 1–3 are identified by the same reference numerals. In the embodiment of FIG. 4, the electrodes occupy a major portion of the electric treating compartment 17. A plurality of vertically disposed screen electrodes 70 is supported from horizontal rods 71 which in turn are supported on vertical rods 72 depending from the feed-through bushing 46 and an insulator 73. Ground electrodes are positioned between adjacent pairs of the high-voltage electrodes 70 and each ground electrode comprises a semicircular plate 75 affixed to the wall of the vessel 15 and having an apertured section 76, typically a screen section, in the central portion of the plate 75. Clearance openings 77 are provided in the plate 75 for the high-voltage electrode rods 71. A small opening 78 may be provided near the top of each plate 75 permitting oil and any trapped gas to flow toward the outlet line 61.

A baffle 79 is mounted at its edges to the vessel 15 in a position similar to the baffle 50 of FIG. 1. The emulsion flows from left to right as viewed in FIG. 4 and is directed up away from the emulsion-water interface 39 and into the central portion of the electrodes by the baffle 79, which extends vertically clear across the interface 39.

Some alternative arrangements are illustrated in the embodiment of FIGS. 7 and 8, where elements corresponding to those shown in FIGS. 1–6 are identified by the same reference numerals. The vessel 15 is disposed horizontally instead of being tilted slightly from the horizontal. Also, the first of the ground electrode plates 75, designated as 81, extends downward past the emulsion-water interface 39. With the electrode plate 81 extending below the interface 39, the baffle 79 can be omitted since the plate 81 will cause the emulsion to flow up away from the interface 39 and into the electric field about the electrodes 70. Alternatively, the first ground electrode 81 can be made the same size as the other ground electrodes 75, as in the embodiment of FIG. 4, and then the baffle 79 will produce all of the flow control operation. Or, the baffle 79 and the plate 81 can both be used to provide the desired flow control, which is a composite of the flow deflecting action produced by these elements.

Another alternative configuration is illustrated in FIGS. 9 and 10, where elements corresponding to those of the preceding figures are identified with the same reference numerals. In the embodiment of FIG. 9, the vessel 15 is tilted from the horizontal with the left or inlet end higher than the right or outlet end. Incoming fluid enters via line 85 and is deflected downward into the pretreating section 16 by an inlet box 86. In the treating zone 18, a ground electrode plate 87 extends from side to side of the vessel and projects upward across the gas-emulsion interface 28. A screen electrode 88, similar to the electrode 43 of FIG. 1, is positioned adjacent the plate 87 to form an electric field therebetween. A ground electrode baffle plate 89 is positioned from side to side in the vessel and projects downward across the emulsion-water interface 39. Additional electrodes may be positioned in the electric treating compartment 17, if desired, such as the set of electrodes 55, 56 illustrated in FIG. 9.

In the operation of the treater of FIG. 9, emulsion flows from the pretreating section 16 under the plate 87 into the electric field of the treating zone 18. The emulsion flow is directed up away from the interface 39 by the baffle 89. The treated emulsion then flows into the settling zone 19 wherein water gravitates to the interface 39 and oil flows toward the outlet line 61.

In the treater of the invention, the vessel is disposed generally horizontally and the fluid flows through the vessel in a general horizontal direction, as contrasted to the upright or vertical type of treaters. While the vessel may be disposed exactly horizontal as shown in FIG. 7, it is preferred that it be tilted slightly with respect to the horizontal, preferably in the range of 10° to 30°. This tilt simplifies the collection and removal of gas and water. In the arrangement of FIG. 9, the static head increases toward the outlet end and aids in keeping in solution the gas which has not been separated in the pretreatment stage.

It will be recognized that other variations of the treater can be incorporated, particularly in the selection and design of the electrode structures as well as the pretreating section and the various accessories.

I claim:

1. In an electric treater for resolving oil-water emulsions containing gas and adapted for connection to a high-voltage source of potential, the combination of:

a generally horizontal vessel providing a pretreating section and a horizontally-elongated electric-treating compartment at different positions along the length of said vessel, there being means in said pretreating section for receiving said emulsion, heating the emulsion, separating gas from the heated emulsion and removing the gas from the vessel, thereby producing a degassed emulsion;

means for delivering the degassed emulsion from said pretreating section to one end of said electric-treating compartment, and means for withdrawing treated oil from the top of said compartment at the opposite end thereof;

at least one pair of electrodes connected to said high-voltage source to establish an electric field therebetween, the electrodes being mounted in said electric-treating compartment, the electric field treating the degassed emulsion to separate water therefrom which collects as a body in the bottom of said electric-treating compartment;

interface means for maintaining an emulsion-water interface between said body of separated water and the flowing emulsion thereabove, the flowing emulsion tending to flow along said interface in a zone below the bottoms of said electrodes spaced from said interface while the flowing emulsion is confined by side walls of said vessel that lie in the vicinity of said interface;

an upright baffle in said electric-treating compartment extending laterally of said vessel between said side walls and traversing said interface, the top of said upright baffle being above said interface but spaced from the top of said compartment, whereby flow of said emulsion along said interface is blocked by said upright baffle and said emulsion is caused to flow in a direction normal to the interface, the bottom of said upright baffle being spaced from the bottom of said vessel thereby providing a flow space openly connecting portions of the water body on opposite sides of the baffle, said baffle deflecting vertically toward said electric field the emulsion tending to flow horizontally along said interface with said interface means maintaining said interface at a level between the top and bottom of said baffle; and means for withdrawing water from said body of water.

2. An electric treater as defined in claim 1 in which said electrodes are substantially flat and are mounted in upright, substantially parallel relationship with the electrodes traversing the longitudinal axis of said electric treating compartment.

3. An electric treater as defined in claim 2 in which said upright baffle is disposed at a position between said one end of said electric treating compartment and the first electrode of said pair.

4. An electric treater as defined in claim 2 in which one of said electrodes is at a high potential with respect to another electrode and the vessel, and in which said upright baffle is disposed adjacent said one electrode to function as another grounded electrode.

5. An electric treater as defined in claim 1 in which said means for delivering the degassed emulsion to said one end of said electric treating compartment comprises a passage means in the lower half of the cross section of the compartment at such one end.

6. An electric treater as defined in claim 2 including an additional pair of substantially flat foraminous electrodes connected to a high voltage source to establish an electric field therebetween, said additional electrodes being mounted in said electric treating compartment between said one pair of electrodes and said opposite end of said compartment in generally horizontal, parallel relationship.

7. An electric treater as defined in claim 2 including a plurality of pairs of said electrodes spaced from each other along the length of said electric treating compartment, with alternate ones of said electrodes supported from upper baffles depending from the top of said vessel and extending between upper side walls thereof, said upper baffles having lower edges terminating a substantial distance above the horizontal axis of said compartment.

8. An electric treater as defined in claim 7 in which said upright baffle comprises the lower portion of one of said alternate electrodes.

9. An electric treater as defined in claim 1 in which said vessel is generally cylindrical with closed ends and in which the axis of the cylinder is tilted relative to the horizontal.

10. An electric treater as defined in claim 9 in which said cylinder axis is tilted in the range of about 10 to 30°.

11. An electric treater as defined in claim 2 in which said vessel is generally cylindrical with closed ends and in which the axis of the cylinder is tilted relative to the horizontal.

12. An electric treater for resolving oil-water emulsions, said treater including in combination:

a generally horizontal elongated vessel providing a horizontally elongated electric-treating compartment;

means for delivering emulsion to one end of said electric-treating compartment and means for withdrawing treated oil from the top of said compartment at the opposite end thereof;

electrodes in said electric-treating compartment and means for establishing therebetween a high-voltage electric field, said electric field treating the emulsion to separate water therefrom which collects as a body in the bottom of the electric-treating compartment, there being an emulsion-water interface between said body of separated water and the flowing emulsion thereabove, the flowing emulsion tending to flow along said interface in a zone below said electrodes spaced from said interface while the flowing emulsion is confined by side walls of said vessel that lie in the vicinity of said interface;

an upright baffle in said electric-treating compartment extending laterally of said vessel between said side walls, said upright baffle traversing said interface at a position adjacent said one end of said compartment and said electrodes, the top of said upright baffle being above said interface but spaced from the top of said compartment, the bottom of said upright baffle being spaced from the bottom of said vessel thereby providing a flow space openly connecting portions of the water body on opposite sides of the baffle, said baffle deflecting vertically toward said electric field emulsion tending to flow horizontally along said interface; and means for withdrawing water from said body of water at a rate to maintain said interface at a level between the top and bottom of said upright baffle.

13. In an electric treater for resolving oil-water emulsions containing gas and adapted for connection to a high-voltage source of potential, the combination of:

a generally horizontal vessel providing a gas separation zone and a settling zone at different positions along the length of said vessel with an electric treating zone therebetween, there being means in said gas separation zone for receiving said emulsion, heating the emulsion, separating gas from the heated emulsion and removing the gas from the vessel, thereby producing a degassed emulsion;

at least one pair of substantially flat electrodes mounted in said electric treating zone in upright, substantially parallel relationship with electrodes traversing the longitudinal axis of said vessel, and with the electrodes connected to said high-voltage source to establish an electric field therebetween, the electric field treating the degassed emulsion to separate water therefrom which collects as a body in the bottom of said vessel;

interface means for maintaining an emulsion-water interface between said body of separated water and the flowing emulsion thereabove, the flowing emulsion tending to flow along said interface below the bottoms of said electrodes spaced from said interface while the flowing emulsion is confined by side walls of said vessel that lie in the vicinity of said interface;

an upright baffle at said electric-treating zone extending laterally of said vessel between said side walls and traversing said interface, the top of said upright baffle being above said interface but spaced from the top of said vessel, whereby flow of said emulsion horizontally along said interface is blocked by said upright baffle and said emulsion is caused to flow in a direction normal to the interface, the bottom of said upright baffle being spaced from the bottom of said vessel thereby providing a flow space openly connecting portions of the water body on opposite sides of the baffle, said baffle deflecting vertically toward said electric field the emulsion tending to flow horizontally along said interface with said interface means maintaining said interface at a level between the top and bottom of said baffle;

means for withdrawing treated oil from the top of said settling zone; and means for withdrawing water from said body of water.

References Cited
UNITED STATES PATENTS 3,207,686  9/1965  Jarvis et al. _____ 204—302
3,476,678  11/1969  Murdock, Sr. _____ 204—302X TA-HSUNG TUNG, Primary Examiner N. A. KAPLAN, Assistant Examiner U.S. Cl. X.R.

204—306, 308, 188